United States Patent [19]
Hanks

[11] Patent Number: 4,966,507
[45] Date of Patent: Oct. 30, 1990

[54] ROUTER JIG

[76] Inventor: Robert Hanks, 1925 Texas Ave., Bridge City, Tex. 77611

[21] Appl. No.: 427,778

[22] Filed: Oct. 27, 1989

[51] Int. Cl.$^5$ ............................................. B27C 5/10
[52] U.S. Cl. ..................................... 409/175; 33/197; 144/144 R; 144/144.5 R; 409/178
[58] Field of Search ............... 409/175, 178, 181, 182; 408/115 R; 144/85, 87, 134 D, 136 C, 144 R, 144.5; 33/197

[56] References Cited
U.S. PATENT DOCUMENTS

| | | | |
|---|---|---|---|
| 3,095,915 | 7/1963 | Tesar et al. | 144/144.5 |
| 3,841,368 | 10/1974 | Ritter | 144/144 R |
| 4,155,383 | 5/1979 | Welliver | 144/134 D |
| 4,215,731 | 8/1980 | Maynard | 144/134 D |
| 4,281,694 | 8/1981 | Gorman | 144/134 D |
| 4,373,562 | 2/1983 | Vernon | 144/144.5 |
| 4,434,824 | 3/1984 | Bussey | 409/178 |
| 4,630,657 | 12/1986 | Obradovich | 144/134 D |

Primary Examiner—Daniel Howell
Attorney, Agent, or Firm—Harrison & Egbert

[57] ABSTRACT

A router jig comprising a baseplate having an open interior, a first horizontal guide adjustably attached to the baseplate, a first vertical guide attached to the baseplate, and a clamp adjustably fastened to the baseplate for receiving a workpiece. Both the first horizontal guide and the first vertical guide extend across the open interior of the baseplate. A second horizontal guide is also adjustably attached to the baseplate. This second horizontal guide extends across the open interior of the baseplate and is in adjustable parallel relationship to the first horizontal guide. A second vertical guide is also adjustably attached to the baseplate so as to be in adjustable parallel relationship to the first vertical guide. The clamp includes a first board and a second board that are adjustably fastened to the underside of the baseplate. The clamp includes a suitable adjustment mechanism for fixing the position of the workpiece within the clamp. This adjustment mechanism includes a camshaft that is mounted to the first board of the clamp along one side of the first board and a dowel pin that is connected to the camshaft and extends through the board so as to open it to the area between the two boards. A subclamp is mounted beneath the clamp so as to extend in a direction transverse to the clamp. The subclamp receives a portion of the workpiece therein.

16 Claims, 3 Drawing Sheets

ROUTER JIG

TECHNICAL FIELD

The present invention relates to jigs and fixtures. More particularly, the present invention relates to adjustable router box jigs.

BACKGROUND ART

A router is a commonly available piece of power equipment which is used for cutting precise edges and grooves in a workpiece. Although there are guide mechanisms known in the prior art which permit a straight cut or groove to be made in a workpiece, problems arise when one is faced with the task of making a plurality of identical grooves in parallel along the length of a workpiece or an array of identically positioned grooves in a sequence of workpieces. In a typical straight line cutting guide, the workpiece is clamped securely to the guide and the required cut is made. In order to make additional cuts parallel to the first the workpiece must be loosened within the guide for each cut and must be manually measured, marked, and repositioned, in order to line up properly with the preceding cut. This procedure is time consuming and subject to operator error as each cut is essentially a distinct operation. The opportunity exists for cumulative error to be introduced, which results in non-parallel or irregular spacing.

Several U.S. patents have issued which offer guides for routers. Most of these prior art devices lack the necessary flexibility, adaptability, and variety of applications.

U.S. Pat. No. 4,434,824, issued on Mar. 6, 1984, to P. D. Bussey shows a router guide for a router that has a first and second spaced apart end supports that are adapted to be removably positioned on spaced-apart supporting surfaces. The router track comprises an elongated spaced-apart angle member that is adapted to receive and support the router base. The angle members are spaced apart to define an elongated opening extending therebetween and adapted to receive the power shaft of the router which extends downwardly therethrough. The support members are selectively vertically and horizontally mounted on the end supports. The router track may be selectively moved between the end supports and the router may be selectively moved between the ends of the router track.

U.S. Pat. No. 4,281,694, issued on Aug. 4, 1981, to T. E. Gorman, describes a power tool cutting guide for making plural parallel cuts or arcuate cuts in a workpiece. This device has a member which is rotatable within the circular track of a frame. This member can be fixed in any angular orientation relative to the workpiece. A guide assembly is joined to this rotatable member on which the tool support plate can slide between positionable stops. This device utilizes a ratchet arm with an attached pawl which engages the serrations in a rack so as to incrementally move a workpiece along a fence. The guide of this device includes a spring-urged retention ar which holds the workpiece firmly against the face during cutting.

U.S. Pat. No. 4,630,657, issued on Dec. 23, 1986, to G. Obradovich discloses a router guide apparatus that comprises a pair of side rails and a pair of headpieces. The headpieces may be releasably secured together so as to form a "modified box type" router guide. When so secured, the guide may be clamped to a workpiece between the headpieces and a router moved in the guide to form transverse dadoes or cuts therein. Bridges are provided that may be temporarily fixed across the rails at strategic places therealong. The router is releasably positioned within the guide and may be moved longitudinally along the workpiece to make longitudinal cuts or grooves therein. The device may be pivoted so as to make arcuate cuts or grooves in the workpiece as well as straight radial grooves.

U.S. Pat. No. 4,215,731, issued on Aug. 5, 1980, to D. E. Maynard discloses a router guide assembly that includes a suitable fence for supporting and locating a workpiece. Hold-down bars and guide bars are secured to a mounting bar and are movable so that the hold-down bars lie across the workpiece. A carriage is movably mounted on the guide bars and is arranged to carry a router across the workpiece so that the workpiece can be routed.

U.S. Pat. No. 4,155,383, issued on May 22, 1979, to E. V. Welliver provides an accessory for an electric router that facilitates the edging, trimming, and groove cutting on small workpieces. The accessory features a two tier construction such that the router is vertically mounted on the upper tier. The upper tier is vertically movable with respect to the lower tier to accommodate the workpiece therebetween. The upper tier is a pair of parallel guide rails along which the router may be slidably moved through the workpiece. Alternatively, the router may be securely clamped to the guide rails and the workpiece pushed along the work table through the router bit by a safety tool.

It is an object of the present invention to provide a router box jig that facilitates the task of woodworking.

It is another object of the present invention to provide a router jig that is suitable for allowing horizontal and vertical cuts about any face of a piece of wood.

It is still another object of the present invention to provide a router jig that allows the fixed positioning of the workpiece or the sliding of the workpiece through the jig.

It is still a further object of the present invention to provide a router jig that is easy to operate and inexpensive for the home woodworker.

These and other objects and advantages of the present invention will become apparent from a reading of the attached specification and appended claims.

SUMMARY OF THE INVENTION

The present invention is a router jig that comprises a baseplate having an open interior, a first horizontal guide adjustably attached to the baseplate, a first vertical guide adjustably attached to the baseplate, and a clamp mechanism which is adjustably fastened to the baseplate for receiving a workpiece. The first horizontal guide extends across the open interior of the baseplate. The first vertical guide also extends across the open interior of the baseplate transverse to the first horizontal guide. The present invention also includes a second horizontal guide that is adjustably attached to the baseplate and which extends across the open interior of the baseplate. A second vertical guide is also adjustably attached to the baseplate so as to extend across the open interior of the baseplate in parallel relationship to the first vertical guide.

The baseplate has a generally rectangular configuration. The baseplate is made of a generally flat rigid material. The baseplate includes a plurality of slots that are formed therein for receiving the ends of the horizontal and vertical guides. The slots are countersunk on one side of the baseplate so as to allow the fixing of bolts within the countersunk slots.

The first and second horizontal guides have end portions that abut the top surface of the baseplate. The horizontal guides have a central portion that is in abutment with the top surface of the clamp mechanism and which extends inwardly of the open interior of the baseplate. Each of the first and second horizontal guides has securing members at each end. These securing members extend through holes in the horizontal guides. These securing members are releasably connected to the slots in the baseplate so as to allow the horizontal guides to be selectively adjusted. The horizontal guides are movable vertically relative to the baseplate.

The vertical guides are positioned on the top of the baseplate. The horizontal guides extend beneath the vertical guides. Each of the vertical guides includes a notched section extending thereacross which corresponds to the area of the open interior of the baseplate. The horizontal guides extend through this notched section. Each of the vertical guides has securing members at each end that are connected to the slots in the baseplate. The securing members extend through holes in the vertical guides. The securing members are releasable so as to allow the horizontal guides to be selectively adjusted. The vertical guides are movable horizontally relative to the baseplate.

The clamp mechanism of the present invention comprises a first board that is fastened to the underside of the baseplate and a second board fastened to the underside of the baseplate. These first and second boards are adjustable so that the distance between the boards ca be varied. These first and second boards extend horizontally across the open interior of the baseplate. These boards are releasably fastened within slots in the baseplate. The ends of the first and second boards extend beyond the exterior of the baseplate. Suitable adjustment mechanisms are interconnected to the first board so as to allow the fixing of the position of a workpiece between the first and second boards. This adjustment mechanism comprises a camshaft that is mounted to the first board along on side of the first board. A dowel pin is connected to the camshaft at one end and extends through the board so as to open to the area between the first and second boards. This camshaft causes the dowel to be movable between a first position inward of the first board and a second position outward of the board. This adjustment mechanism further comprises a second dowel pin connected to the camshaft distal of the first dowel pin.

The present invention further comprises a subclamp mounted between the clamp mechanism so as to extend transverse to the clamp mechanism. This subclamp extends across the open interior of the baseplate. The subclamp is for fixing a workpiece therewithin. This subclamp is specifically designed to fix the narrow edges of a workpiece together. The subclamp comprises a first member that is fastened to the baseplate and includes a notch so as to accommodate the positioning of the clamp mechanism. This subclamp has a second member which is connected to the first member such that the distance between the first and second members can be varied. A spacer is adjustably connected between the first and second members so as to allow the fixing of the position of the workpiece as between the first and second members.

DETAILED DESCRIPTION OF THE INVENTION

Figure 1:
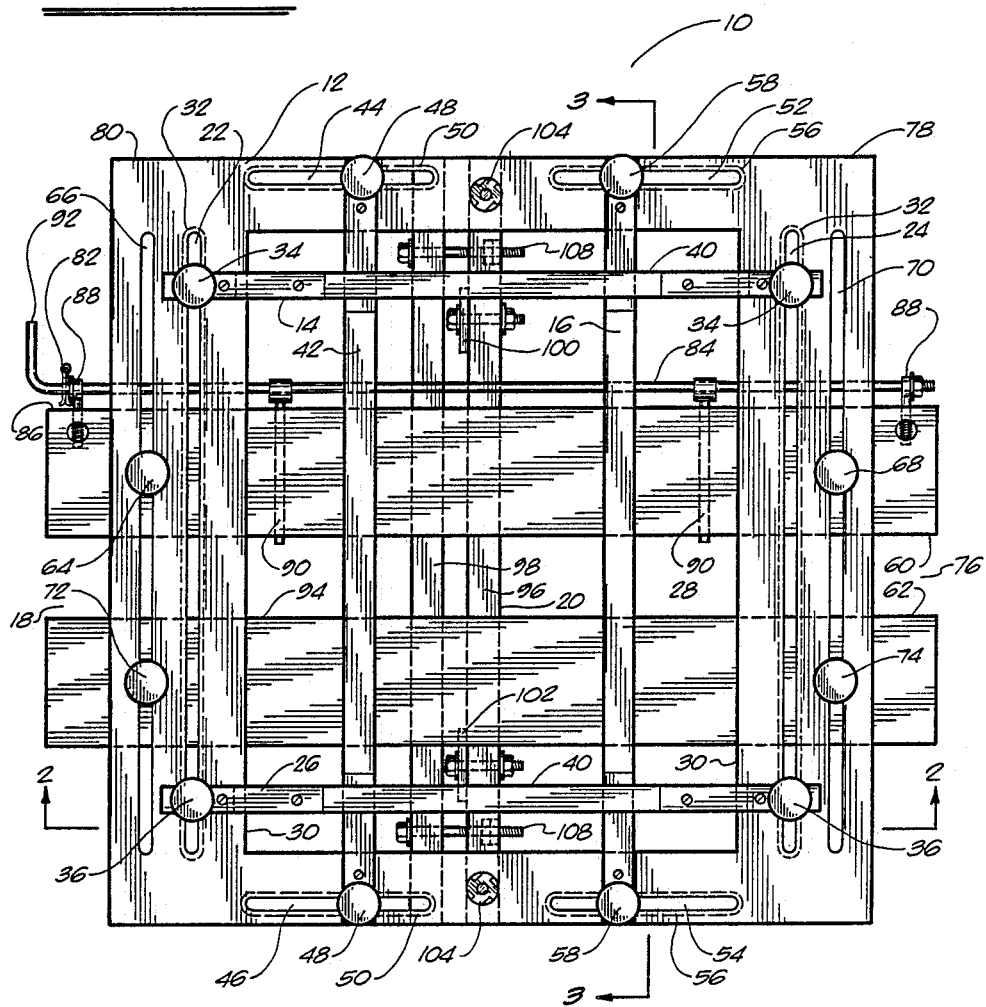
FIG. 1 is a top view showing the configuration of the router jig in accordance with the preferred embodiment of the present invention.

Referring to FIG. 1, there is shown at 10 the router jig in accordance with the preferred embodiment of the present invention. Jig 10 comprises baseplate 12, first horizontal guide 14, first vertical guide 16, and clamping mechanism 18. Additionally, in FIG. 1, there is shown the subclamp 20.

The baseplate has a generally square or rectangular configuration. Typically, the baseplate 12 will be of a flat rigid material, such as wood, steel, or molded plastic. Baseplate 12 has slots 22 and 24 that receive the first horizontal guide 14 and the second horizontal guide 26. Slots 22 and 24 extend vertically along one portion of baseplate 12. Baseplate 12 includes an open interior area 28 of square, or rectangular, configuration. The open interior area 28 is that area which receives the portable router and the workpiece. The vertical slots 22 and 24 extend along and are aligned with edge 30 of baseplate 12. Each of the slots 22 and 24 has a countersunk portion (illustrated in dotted line) 32 on the reverse side of baseplate 12. These countersunk portions 32 are lined with slots 22 and 24 so as to receive bolts therewithin. The bolts received by the countersunk portion 32 are connected to the thumbwheels 34 of first horizontal guide 14. In order to allow the adjustability of the first horizontal guide 14, the thumbwheels 34 can be loosened so as to allow the first horizontal guide 14 to traverse the pathway of slot 22. Similarly, on the second horizontal guide 26, thumbwheels 36 extend through the ends of the second horizontal guide 26 so as to be received by the slot 22 and the countersunk portion 32. In this manner, the thumbwheels 36 can be loosened, or tightened, as desired, so as to allow for the proper positioning of the second horizontal guide 26 relative to the open interior 28 of baseplate 12.

The first horizontal guide 14 and the second horizontal guide 26 are configured so as to extend across the open interior 28 of baseplate 12. Each of these first and second horizontal guides are adjustable so as to allow their selected movement relative to the baseplate 12. Each of the horizontal guides 14 and 26 include a linear edge 40. Linear edge 40 allows for the consistent and even movement of a router thereagainst. Although not specifically illustrated, the first horizontal guide 14 and the second horizontal guide 26 may include markings, or ruler entrys, across the top surface so as to assist the woodworker in the proper alignment of the horizontal guides 14 and 26. Additionally, such ruler entries will allow for the woodworker to properly set and align the first vertical guide 16 and the second vertical guide 42. Based on the configuration of the baseplate 12 and its associated slots 22 and 24, the first horizontal guide 14 will remain in parallel with the second horizontal guide 26. As will be illustrated in connection with FIGS. 2 and 3, the first horizontal guide 14 and the second horizontal guide 26 include end portions that abut the top surface of the baseplate 12. A portion of the horizontal guides 14 and 26 extends downwardly into the open interior 28 of baseplate 12 so as to be in abutment with the top surface of the clamping mechanism 18.

The first vertical guide 16 and the second vertical guide 42 also extend across the open interior 28 of baseplate 12. Baseplate 12 includes slots 44 and 46 for receiving the thumbwheels 48 of the second vertical member 42. These thumbwheels 48 include a bolt that is received by the countersunk portions 50 of slots 44 and 46. As such, the second vertical guide 42 may be selectively moved in a horizontal direction, and appropriately adjusted, by releasing or securing the thumbwheels 48. Similarly, the first vertical guide 16 is received by slot 52 and slot 54 on baseplate 12. Slots 52 and 54 include a countersunk portion 56 that receives the bolt connected to thumbwheels 58. In a similar fashion as the second vertical guide 42, the first vertical guide 16 can be selectively moved so as to traverse the path of slots 52 and 54. The first vertical guide 16 shall remain in parallel to the second vertical guide 42. The first vertical guide 16 and the second vertical guide 42 may include suitable ruler markings on the top surface thereof so as to allow for the proper setting of the first vertical guide 16 and the first vertical guide 42. These ruler markings may also be used to assist in the proper location and alignment of the first horizontal guide 14 and the second horizontal guide 26. The first vertical guide 16 and the second vertical guide 42 shall move in a longitudinal direction relative to the baseplate 12. The first vertical guide 16 and the second vertical guide 42 also includes a notched section that extends thereacross and corresponds to the area of the open interior 28 of baseplate 12. This notched section will allow the upper surfaces of the first horizontal guide 14 and the second horizontal guide 26 to be moved therewithin.

The clamp mechanism 18 includes a first board 60 and a second board 62. The first board is fastened by thumbwheel 64 to the slot 66 which extends vertically on baseplate 12. First board 60 also is fastened by thumbwheel 68 to slot 70 on baseplate 12. As such, the first board 60 of clamp mechanism 18 can be selectively moved vertically relative to baseplate 12. The opening or the closing of the thumbscrews 64 and 68 can be used to fix or release the position of the first board 60 relative to the slots 66 and 70 of baseplate 12.

Second board 62 is also fastened to the baseplate 12 in a similar fashion. Second board 62 includes a thumbscrew 72 that is fastened to slot 66 of baseplate 12. Second board 62 is also connected by thumbscrews 74 to the slot 70 of baseplate. In this fashion, the first board 60 and the second board 62 can move vertically relative to each other. The open area 76 between the first board 60 and the second board 62 can be used to clamp a workpiece therebetween. Alternatively, the first board 60 and the second board 62 may be secured so as to allow a workpiece to travel through open area 76. The ends of the boards 60 and 62 extend beyond the exterior edges 78 and 80 of baseplate 12. It can be seen in FIG. 1 that the first board 60 of clamp mechanism 18 includes an adjustment mechanism 82. This adjustment mechanism is interconnected to first board 60 and is included for the purposes of fixing the position of a workpiece in the open area 76 between boards 60 and 62. Specifically, the adjustment mechanism 82 includes a camshaft 84 that is mounted to the side 86 of first board 60. Camshaft 84 is connected by eyebolts 88 to the board 60. Dowel pins 90 are fastened to camshaft 84 and extend through openings in the first board 60 so as to open to the area 76 between boards 60 and 62. By turning the camshaft 84 with handle 92, the dowel pins 90 are pushed through these holes so as to allow the workpiece within area 76 to be fixed in position adjacent the edge 94 of second board 62. After experimentation, it has been found that the preferred embodiment is to have two dowel pins 90. This allows for the proper fixing of the board within the area 76. It also allows for a balanced fixing of position. By turning the handle 92 and a camshaft 84, the dowel pins 90 move inwardly aboard 60 so as to release the workpiece from within the area 76 between boards 60 and 62.

In FIG. 1, it can be seen that the subclamp 20 is mounted beneath the clamp mechanism 18 so as to extend transverse to the clamp mechanism 18. Subclamp 20 extends across the open interior 28 of baseplate 12. The subclamp 20 is designed for the purpose of holding stock vertically in jig 10 so that finger joints and dovetail joints can be cut. Subclamp 20 comprises first member 96 and second member 98. Spacers 100 and 102 are fastened to the first member 96. Spacers 100 and 102 are arranged so as to allow the ability to cut right and left hand drawer sides. The first member 96 is affixed to the baseplate 12 by bolts 104. These bolts 104 extend through holes that are drilled in and through the first member 96 and received by tee nuts embedded in the baseplate 12. The second member 96 includes the connectors 108 so as to allow the second member 98 to be adjustably fastened to the first member 96. The spacers 100 and 102 may be slidably received by a slot extending longitudinally through the first member 96. By placing a workpiece between members 96 and 98, and tightening the bolts of connectors 108 and properly positioning the spacers 100 and 102, the woodworker can secure the workpiece in place so as to allow suitable routing operations to be carried out.

Figure 2:
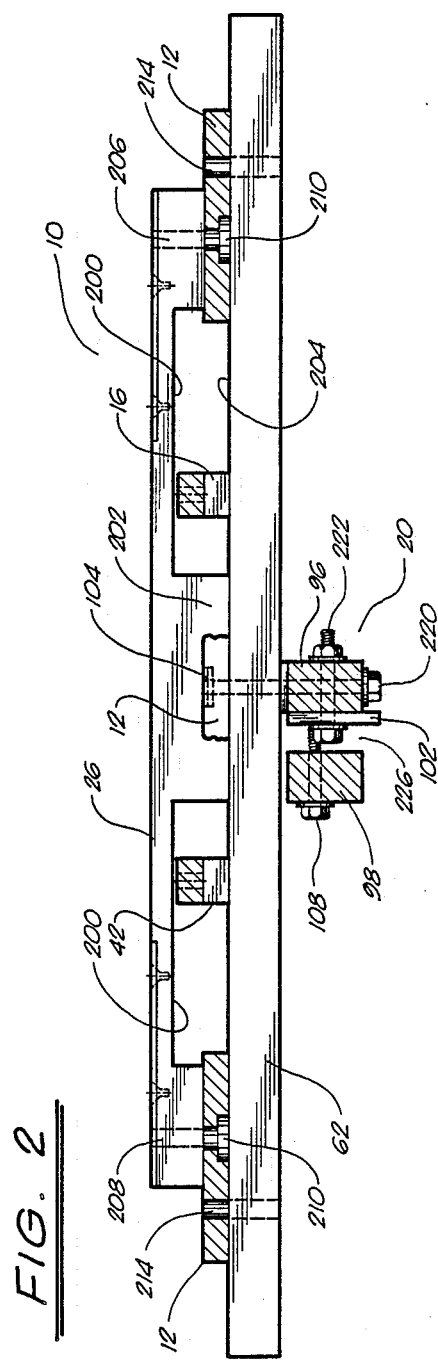
FIG. 2 is a cross-sectional view of the router jig of the present invention as taken across lines 2—2 of FIG. 1.

FIG. 2 is a view taken along line 2—2 of FIG. 1. Specifically, FIG. 2 shows the configuration of the second horizontal member 26 in relationship to the first vertical member 16 and the second vertical member 42. As can be seen, the second horizontal member 26 includes notched area 200 that occurs adjacent to the open interior of baseplate 12. It can be seen that the second horizontal guide 26 includes surface 202 that will abut the top surface 204 of second board 62. The first vertical guide 16 and the second vertical guide 42 are positioned beneath the second horizontal guide 26 into the notched areas 200. Furthermore, in FIG. 2, it can be seen that the second horizontal guide 26 includes an openings 206 and 208 that are suitable for receiving the thumbwheels 36. Thumbwheels 36 extend downwardly through the openings 206 and 208 and are received within the countersunk portion 210. Countersunk portion 210 will receive the bolt that is connected to the threaded member attached to the thumbwheels 36. Countersunk portions 210 occur in baseplate 12. Additionally, it can be seen that the openings 214 occur on baseplate 12 for receiving the thumbwheels of the second board 62 of clamp mechanism 18. These openings extend through second board 62. The tightening or loosing of the thumbwheels in the second board 62 allow for the adjustment of the second board 62 relative to the first board 60. Furthermore, FIG. 2 shows the subclamp arrangement 20. It can be seen that the first member 96 of subclamp 20 includes a bolt 220 that extends therethrough and is received by tee nut 104 on baseplate 12. This configuration allows for the option of fixing of the first member 96 of subclamp 20. Spacer 102 is connected by threaded member 222 to the first member 96. The second member 98 is also connected, at the other end, to first member 96 by bolt 108. The loosening or the tightening of bolt 108 can allow for the proper adjustment of the space 226 between the first member 96 and the second member 98. Additionally, the spacer 102 can slide longitudinally along first member 96 so as to allow for the proper positioning of the dimension of the workpiece.

Figure 3:
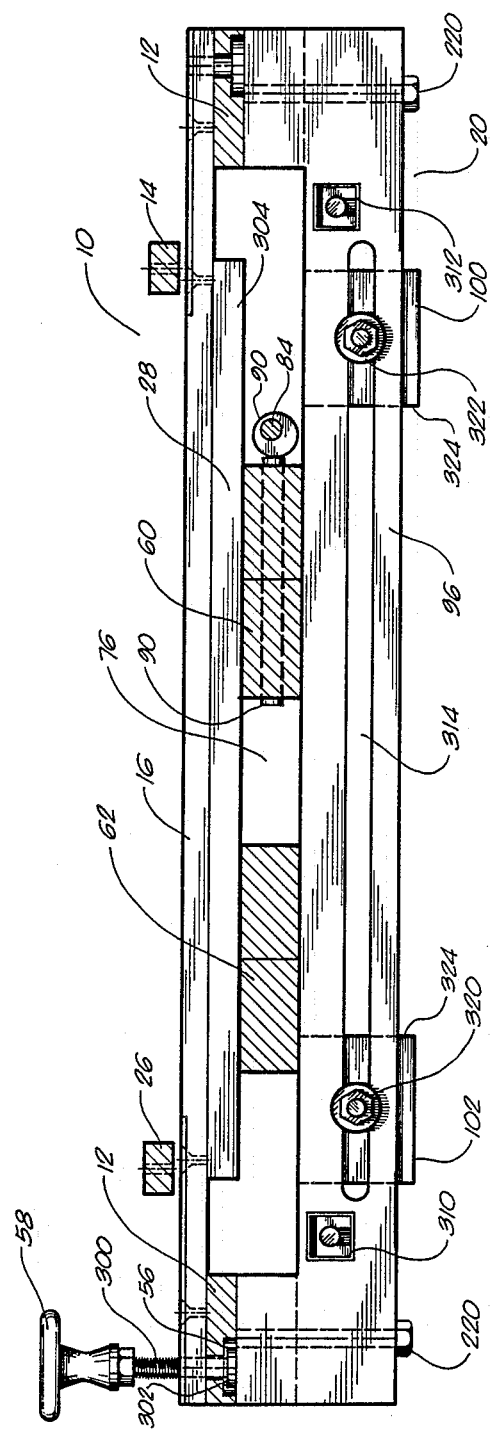
FIG. 3 is a cross-sectional view of the present invention as taken across lines 3—3 of FIG. 1.

FIG. 3 is a cross-sectional view taken across lines 3—3 of FIG. 1. Specifically, in FIG. 3, it can be seen how the thumbwheel 58 is attached by threaded member 300 to the bolt 302 within countersunk portion 56. The first vertical member 16 extends across the open interior 28 of baseplate 12. It can be seen that the second horizontal member 26 and the first horizontal member 14 extend transverse to the direction of the first vertical member 16. The first board 60 and the second board 62 are arranged in abutment with the lower surface 304 of first vertical member 16. It can be seen that the camshaft 84 connects to the dowel pin 90. Dowel pin 90 extends through the interior of the first board 60 so as to open to the area 76 therebetween. Area 76 allows for the placement or travel of a workpiece between boards 60 and 62. The subclamp 20 is affixed by threaded members 220 to the baseplate 12. Nut 310 is fastened into the first member 96 so as to allow for the positioning of the second member 98. Additionally, nut 312, is also connected to the second member 98 and serves to fix the position of the second member 98. Slot 314 extends longitudinally along first member 96 of subclamp 20 so as to allow for the proper fixing of the positions of spacers 100 and 102. The tightening or the loosening of nuts 320 and 322 can allow for the proper adjustment of the spacers 100 and 102. It can be seen that spacers 100 and 102 include a flat edge 324 which i used for surface to surface contact with the workpiece therebetween.

The router jig of the present invention is designed to aid woodworkers with the use of a router. By using the jig of the present invention, the operator can make repetitive identical cuts in rapid succession. Unlike the prior art, the present invention provide the woodworker with two horizontal guides and two vertical guides. This allows for a great deal of versatility and adjustability of the router jig of the present invention.

The optional subclamp 20 is mounted to the underside of the baseplate 12 so as to hold the stock vertically in the jig so that specialized cuts may be performed. By placing the stock within the subclamp, the operator can secure lengthy, but narrow, workpieces therebetween. This allows for the creation of finger joints and dovetail joints in the edges of large sections of wood. Since the subclamp 20 is removable by loosening the threaded members 220, the operator of the jig 10 of the present invention can adapt the jig to his proper needs.

The router jig 10 of the present invention is extremely versatile, easy to operate, and relatively inexpensive. This router jig can be adjusted so the operator can produce most types of woodworking joinery. For example, the operator can produce mortises, tenons, dadoes, rabbit joints, dovetail joints, box joints, etc. If the operator chooses not to secure the stock by the use of the camshaft, the operator can push the workpiece through the jig much like a planar/molder. As a result, tongue-and-groove joints, decorative molding, sliding dovetail joints, and the like, can be produced in this manner.

The foregoing disclosure and description of the invention is illustrative and explanatory thereof, and various changes in the details of the illustrated apparatus, can be made within the scope of the appended claims without departing from the spirit of the invention. The present invention should only be limited by the following claims and their legal equivalents.

I claim:
1. A router jig comprising:
  a baseplate having an open interior;
  a first horizontal guide adjustably attached to said baseplate, said first horizontal guide extending across said open interior of said baseplate;
  a first vertical guide adjustably attached to said baseplate, said first vertical guide extending across said open interior of said baseplate transverse to said first horizontal guide; said baseplate having a rectangular configuration, said baseplate being of a generally flat rigid material, said baseplate having a plurality of slots formed therein for receiving a portion of said first horizontal guide and said first vertical guide, said slots being countersunk on one side of said baseplate so as to allow the fixing of bolts within said countersunk slots; and
  clamp means adjustably fastened to said baseplate for receiving a workpiece.
2. The jig of claim 1, further comprising:
  a second vertical guide adjustably attached to said baseplate, said second vertical guide extending across said open interior of said baseplate, said second vertical guide in parallel relation to said first vertical guide.
3. The jig of claim 2, said first vertical guide and said second vertical guide positioned on the top of said baseplate, each of said first vertical guide and said second vertical guide having a notched section extending across and corresponding to the area of said open interior, said first horizontal guide extending through said notched section.
4. The jig of claim 2, each of said first and second vertical guides having securing members at each end, said securing members extending through holes in said first and second vertical guides, said securing members being releasable so as to allow said first and second vertical guides to be selectively adjusted.
5. The jig of claim 4, each of said first and second vertical guides being movable horizontally relative to said baseplate.
6. A router jig comprising:
  a baseplate having an open interior;
  a first horizontal guide adjustably attached to said baseplate, said first horizontal guide extending across said open interior of said baseplate;
  a first vertical guide adjustably attached to said baseplate, said first vertical guide extending across said open interior of said baseplate transverse to said first horizontal guide;
  clamp means adjustably fastened to said baseplate for receiving a workpiece; and
  a second horizontal guide adjustably attached to said baseplate, said second horizontal guide extending across said open interior of said baseplate, said second horizontal guide in parallel relation to said first horizontal guide.
7. The jig of claim 6, said first and second horizontal guides having end portions abutting the top surface of said baseplate, said first and second horizontal guides having a central portion in abutment with the top surface of said clamp means.

8. The jig of claim 6, each of said first and second horizontal guides having securing members at each end, said securing members extending through holes in said first and second horizontal guides, said securing members being releasable so as to allow said first and second horizontal guides to be selectively adjusted.

9. The jig of claim 8, each of said first and second horizontal guides being movable vertically relative to said baseplate.

10. A router jig comprising:
   a baseplate having an open interior;
   a first horizontal guide adjustably attached to said baseplate, said first horizontal guide extending across said open interior of said baseplate;
   a first vertical guide adjustably attached to said baseplate, said first vertical guide extending across said open interior of said baseplate transverse to said first horizontal guide; and
   clamp means adjustably fastened to said baseplate for receiving a workpiece, said clamp means comprising:
      a first board fastened to the underside of said baseplate;
      a second board fastened to the underside of said baseplate, the distance between said first and second boards being adjustable, said first and second boards extending horizontally across said open interior of said baseplate, said first and second boards releasably fastened within slots in said baseplate; and
      adjustment means connected to said first board and said second board for permitting the distance between said first board and said second board to be adjusted.

11. The jig of claim 10, the ends of said first and second boards extending beyond the exterior of said baseplate.

12. The jig of claim 10, further comprising:
   adjustment means interconnected to said first board, said adjustment means for fixing the position of the workpiece between said first and second boards.

13. The jig of claim 12, said adjustment means comprising:
   a camshaft mounted to said first board along one side of said first board;
   a dowel pin connected to said camshaft at one end and extending through said first board so as to open to the area between said first and second boards.

14. The jig of claim 13, said camshaft causing said dowel pin to be movable between a first position inward of said first board and a second position outward of said first board, said adjustment means further comprising a second dowel pin connected to said camshaft distal said first dowel pin.

15. A router jig comprising:
   a baseplate having an open interior;
   a first horizontal guide adjustably attached to said baseplate, said first horizontal guide extending across said open interior of said baseplate;
   a first vertical guide adjustably attached to said baseplate, said first vertical guide extending across said open interior of said baseplate transverse to said first horizontal guide;
   clamp means adjustably fastened to said baseplate for receiving a workpiece; and
   a subclamp mounted between said clamp means so as to extend transverse to said clamp means, said subclamp extending across said open interior, said subclamp for fixing a workpiece therebetween.

16. The jig of claim 15, said subclamp comprising:
   a first member fastened to said baseplate, said first member having a notch therein so as to accommodate the position of said clamp means;
   a second member connected to said first member such that the distance between said first and second members can be varied; and
   a spacer adjustably connected between said first and second members, said spacer for fixing the position of a workpiece a between said first and second members.

* * * * *